United States Patent [19]
Takagi

[11] Patent Number: 5,664,837
[45] Date of Patent: Sep. 9, 1997

[54] RECLINING DEVICE FOR VEHICLE SEAT

[75] Inventor: Genjiro Takagi, Akishima, Japan

[73] Assignee: Tachi-S Co., Ltd., Tokyo, Japan

[21] Appl. No.: 624,244

[22] Filed: Mar. 29, 1996

[51] Int. Cl.[6] .................................................. B60N 2/20
[52] U.S. Cl. ................................................ 297/367; 297/369
[58] Field of Search ................................. 297/367, 369

[56] References Cited

U.S. PATENT DOCUMENTS

| | | | |
|---|---|---|---|
| 3,641,838 | 2/1972 | Turner | 297/369 X |
| 3,737,946 | 6/1973 | Giuliani | 297/367 X |
| 3,879,802 | 4/1975 | Werner | 297/367 X |
| 4,082,352 | 4/1978 | Bales et al. | 297/367 X |
| 4,085,969 | 4/1978 | Nakane et al. | 297/367 |
| 4,087,885 | 5/1978 | Gillentine | 297/367 X |
| 4,103,970 | 8/1978 | Homier | 297/367 X |
| 4,188,064 | 2/1980 | Cheshire | 297/367 |
| 4,348,050 | 9/1982 | Letournoux et al. | 297/367 X |
| 4,384,744 | 5/1983 | Barley | 297/367 |
| 4,435,013 | 3/1984 | Arihara | 297/364 |
| 4,523,786 | 6/1985 | Letournoux et al. | 297/367 |
| 4,758,046 | 7/1988 | Cousin et al. | 297/367 X |
| 4,770,464 | 9/1988 | Pipon et al. | 297/367 |
| 4,874,205 | 10/1989 | Arefinejad et al. | 297/367 X |
| 5,161,856 | 11/1992 | Nishine | 297/367 |
| 5,547,254 | 8/1996 | Hoshihara | 297/367 |
| 5,547,255 | 8/1996 | Ito et al. | 297/367 |
| 5,558,402 | 9/1996 | Yamada | 297/367 X |
| 5,558,403 | 9/1996 | Hammored et al. | 297/367 X |
| 5,588,705 | 12/1996 | Chang | 297/367 |
| 5,590,931 | 1/1997 | Fourrey et al. | 297/367 X |

FOREIGN PATENT DOCUMENTS

| | | | |
|---|---|---|---|
| 2254199 | 7/1975 | France | 297/367 |
| 2364754 | 8/1974 | Germany | 297/367 |
| 60-135338 | 7/1985 | Japan . | |
| 893419 | 6/1960 | United Kingdom . | |
| 1038878 | 8/1966 | United Kingdom | 297/367 |

Primary Examiner—Peter M. Cuomo
Assistant Examiner—Rodney B. White
Attorney, Agent, or Firm—Browdy and Neimark

[57] ABSTRACT

A reclining device for a vehicle seat, which has base arm and an upper arm rotatably connected via a shaft to the base arm, with an arcuate inwardly toothed portion formed in the upper arm. A lock gear member having an outwardly toothed portion is movably supported by two guide elements in a diametrical direction of a circle along which the arcuate inwardly toothed portion is formed, to thereby insure a full meshed engagement between the outwardly and inwardly toothed portions. The lock gear member is operatively connected via a cam plate and interlocking elements to an operation lever. The interlocking elements include enagement pin and elongated guide hole which are coacted by rotation of the operation lever so as to guide the lock gear member in such diametrical direction. Additionally, a non-circular engagement may be arranged between the shaft and upper arm to prevent rotation of the shaft, and a connecting tubular member may be connected coaxially to the shaft.

15 Claims, 6 Drawing Sheets

FIG.1 (A) PRIOR ART
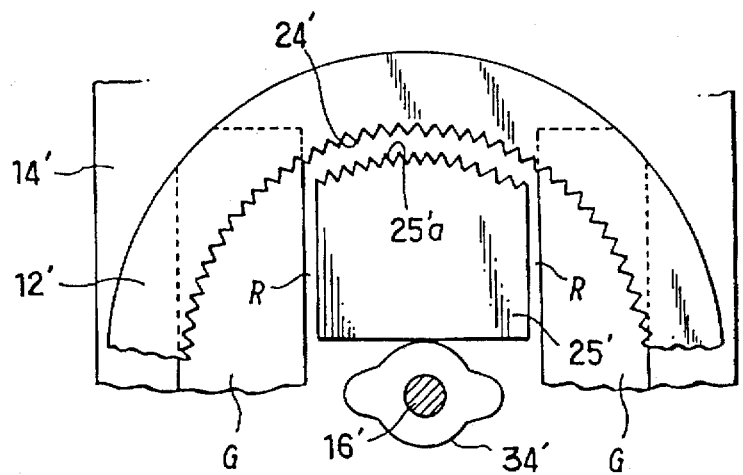
FIG.1 (B) PRIOR ART
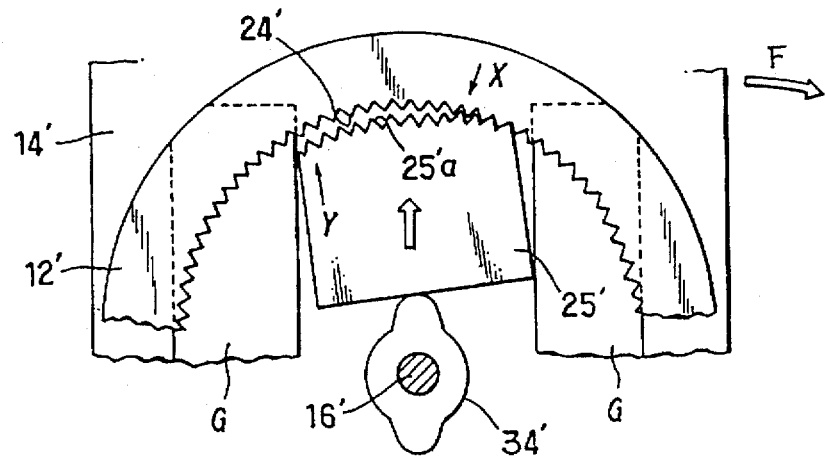
FIG.2 PRIOR ART
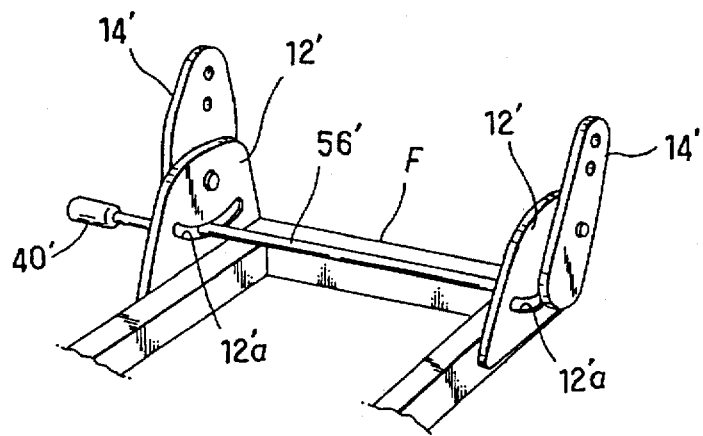

RECLINING DEVICE FOR VEHICLE SEAT

BACKGROUND OF INVENTION

1. Field of the Invention

The present invention relates to a reclining device for use in a vehicle seat, which is operable to adjust the angle of inclination of a seat back with respect to a seat cushion of the seat.

2. Description of Prior Art

Adjustment of a reclining device in a vehicle seat is effected through locking and unlocking operation between a movable upper arm and a stationary lower base arm thereof so that a seat back fixed on the movable upper arm may be adjustably inclined relative to a seat cushion to which the base arm is fixed, in order that a passenger on the seat can take a proper seating posture. One of the locking mechanisms in this reclining device is known from the Japanese Laid-Open Patent Pub. no. 60-135338. Referring to FIGS. 1(A) and 1(B), this type of locking mechanism uses an inwardly toothed lock portion (24') formed in a stationary lower base arm (12') of reclining device, which is fixed to a seat cushion (not shown), and a movable gear block member (25') having an outwardly toothed portion (25'a), which is movably provided at an upper movable arm (14') of same reclining device, the upper movable arm (14') being fixed to a seat back (not shown).

The upper arm (14') is rotatable about a shaft (16') relative to the base arm (12'). Operation of a cam (34') provided on the shaft (16') causes the gear block member (25') to move rectilinearly along and between two guide plates (G)(G) fixed to the upper arm (14') in a diametrical direction towards and away from the axis of shaft (16') so that the outwardly toothed portion (25'a) of gear block member (25') may be brought in meshed engagement with the inwardly toothed portion (24'), and thus, the upper arm (14') (seat back) can be locked at a selected point with respect to the lower arm (12') (seat cushion).

However, in this prior art, to insure smooth sliding movement of the gear block member (25'), a clearance (R) is provided between the guide plate (G) and gear block member (25'), and the cam (34') contacts and supports a small local part of the gear block member (25'). These factors may result in the gear block member (25') being inclined on such small contact point of cam (34') within both lateral clearances (R) (R) given on the opposite sides of gear block member (25'), as shown in FIG. 1(B), when a great force (F) is applied to both mutually meshed inwardly and outwardly toothed portions (24')(25'a) respectively of the base arm (12') and gear block member (25'). As a consequence of such inclination, the movable gear block member (25') is not completely and evenly meshed with the inwardly portion (24') due to the creation of meshed and non-meshed parts (X)(Y) between those two toothed portions (24') (25'a), as in FIG. 1(B), and a load is intensively exerted on the meshed part (X), which reduces a strength of both toothed portions (24')(25'a). Further, although the clearance (R) is designed to a minimum degree, it is not only difficult technically and cost-wise to minimize such clearance (R) with a precision during a mass-production assembling process, but also it is the matter of fact that even a slight inclination of the gear block member (25') is magnified through the concurrent inclination of the upper arm (14') and transmitted to a passenger on the seat as an appreciable inclination of a seat back fixed to the upper arm (14'), thus resulting in a substantial unstable wobbling of the seat back and making the passenger uneasy and uncomfortable therewith.

SUMMARY OF THE INVENTION

In view of the above-stated drawbacks, it is a primary purpose of the present invention to provide an improved reclining device for vehicle seat which prevents a wobbling of seat caused from the inclination of lock gear member in a locked state within the reclining device.

In order to achieve such purpose, the reclining device in accordance with the present invention, basically comprises:
- an arcuate inwardly toothed portion which is formed in an upper arm, generally along a circle having a center at an axis of shaft;
- a guide means formed in the lower base arm;
- a lock gear means including:
  - an outwardly toothed portion;
  - a contact area; and
  - first and second slide means disposed in a diametrical direction along a diameter of the circle along which the arcuate inwardly toothed portion is formed in the lower base arm, said first and second slide means being slidably fitted to said shaft and guide means, respectively;
- wherein the lock gear means is movable via the first and second slide means in the diametrical direction, bringing the outwardly toothed portion to and out of a meshed engagement with a part of the arcuate inwardly toothed portion, to thereby lock and unlock the upper arm with respect to the lower base arm;
- an operation lever having a base end portion rotatably connected to the shaft;
- a biasing means for normally biasing the operation lever to a non-use position; and
- an interlocking means arranged between the lock gear means and operation lever, which includes:
  - a cam means rotatably provided at the shaft, which has a cam end;
  - an engagement guide means for engaging the cam means with the lock gear means and guiding the lock gear means in the diametrical direction; and
  - a connecting means for connecting the cam means to the operation lever.

Accordingly, the lock gear means is guided at the two points, i.e. the shaft and guide means, in the diametrical direction, which thus insures a stable full meshed engagement between the outwardly and inwardly toothed portions, without such wobbling problem as found in the prior art.

Preferably, the first slide means may comprise an elongated hole extending along the diametrical direction, through which elongated hole, the shaft is slidably inserted, and the second slide means may comprise a slide recession extending along the diametrical direction, with the slide recession being slidably fitted to the guide means of lower base arm. Also, the guide means may comprise a projected guide portion which is so formed in the lower base arm as to extend along the diametrical direction.

In the foregoing interlocking means, the engagement guide means may comprise an elongated guide hole formed in the lock gear means and an engagement pin formed on the cam means, such that the engagement pin is slidably engaged in the elongated guide hole. In particular, the elongated guide hole is formed to slant relative to the shaft as as to cause the engagement pin to slide therealong in a direction to transform rotation of the cam means about the shaft into a rectilinear movement of the lock gear means in the diametrical direction.

As one aspect of the present invention, a non-circular section may be formed in the shaft, and further there may be provided a collar member having a non-circular hole formed therein, such that the collar member and non-circular section of shaft are fitted in a hole of the upper arm and the non-circular hole of collar member, respectively, so as to prevent rotation of the shaft relative to the upper and lower base arms.

As another aspect of the invention, the upper arm may be formed with a hole through which the shaft is inserted, and one end of a connecting tubular member is rotatably inserted via a collar member through the hole of upper arm and further connected to the cam means for coaxial operative connection with the operation lever. This arrangement permits another end of the connecting tubular member to be connected to another reclining device identical to the present reclining device, so that the present invention may be applied to a dual-type reclining device.

Other various features and advantages of the present invention will become apparent from reading of the descriptions hereinafter, with reference to the annexed drawings.

BRIEF DESCRIPTION OF THE DRAWINGS

FIG. 1(A) is a schematic diagram showing the constriction of a conventional reclining device;

FIG. 1(B) is a schematic diagram for explanatorily showing a wobbling problem associated with the convention reclining device;

FIG. 2 is a partly broken schematic perspective view of a dual-type reclining device to which the present invention is applied in a conventional ordinary way;

DETAILED DESCRIPTION OF PREFERRED EMBODIMENTS OF THE INVENTION

Figure 3:
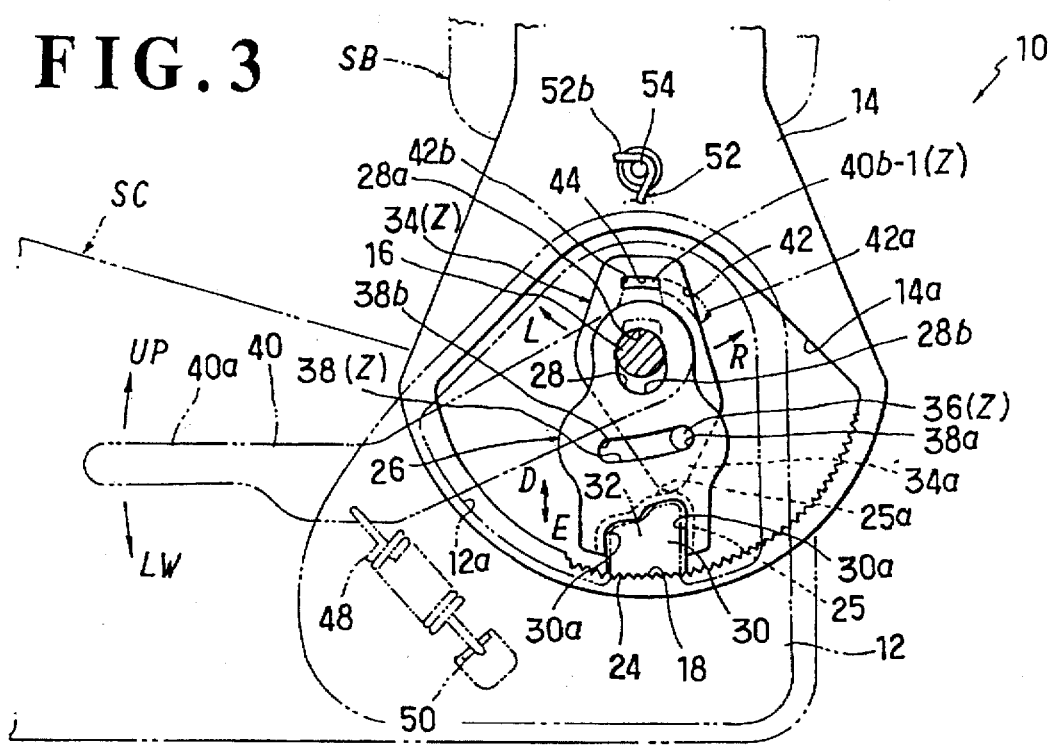
FIG. 3 is a partly broken schematic front view of a principal part in a first embodiment of the reclining device in accordance with the present invention, which also shows actions thereof.

Referring to FIGS. 2 through 10, there are shown preferred constructions of reclining device by way of example in accordance with the present invention.

All through the embodiments in FIGS. 2 to 10, a basic construction of a reclining device contemplated the in the present invention comprises a stationary lower base arm (12), a movable upper arm (14) rotatably connected via a shaft (16) to the lower base arm (12), an inwardly toothed portion (18) formed in the lower base arm (12), a lock gear member (26), an operation lever (40 or 140) rotatably connected to the shaft (16), and an interlocking means generally designated by (Z), the interlocking means (Z) being arranged between the lock gear member (26) and operation lever (40, or 140) such as to interlock them together for the purpose of causing the lock gear member (26) to be engaged with and disengaged from the inwardly toothed portion (18), as, will be elaborated concretely later.

Figure 5:
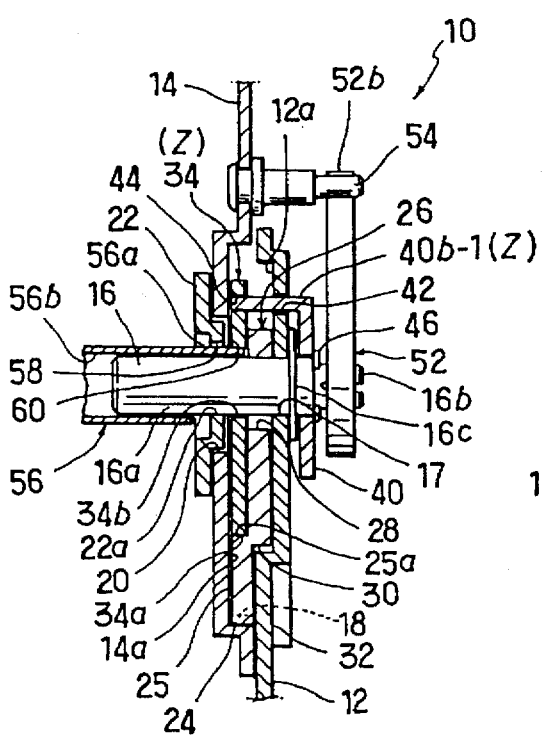
FIG. 5 is a partly broken cross-sectional view of the reclining device of FIG. 3.
Figure 6:
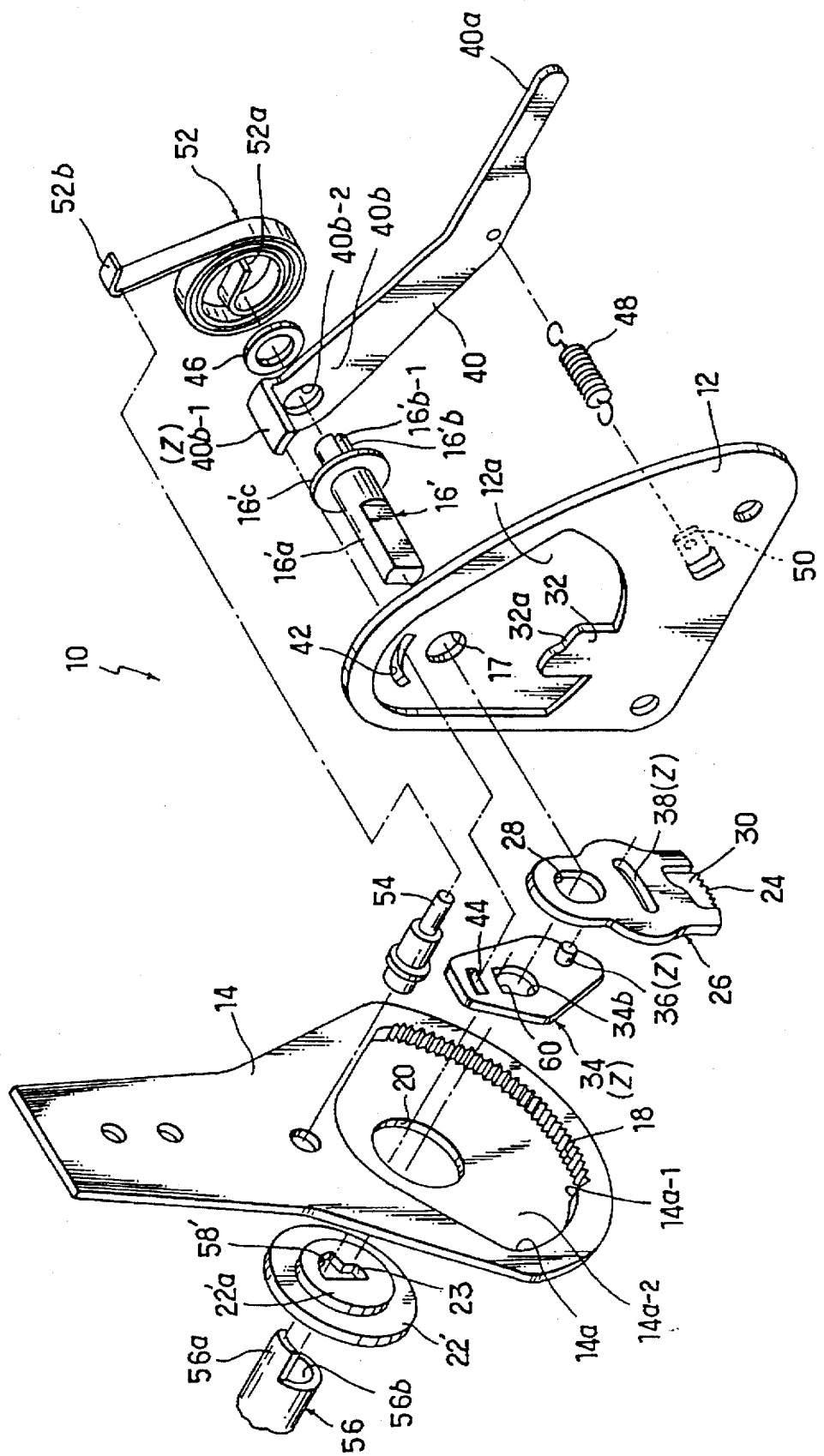
FIG. 6 is an exploded schematic perspective view of a minor modified mode of the reclining device as shown in FIG. 5.
Figure 7:
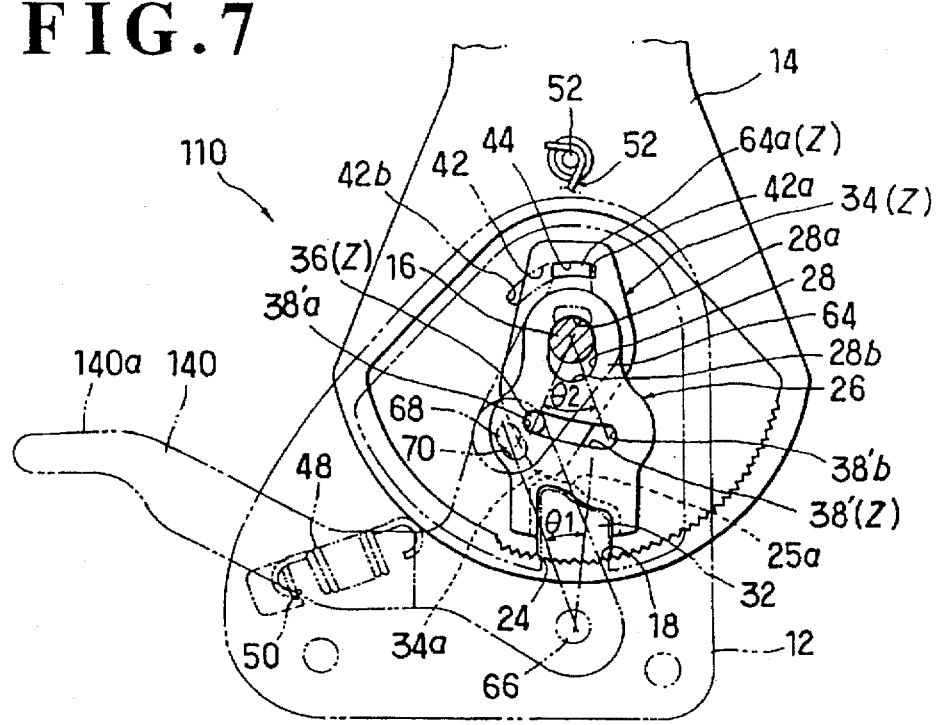
FIG. 7 is a partly broken schematic front view of a principal part a second embodiment of the reclining device in accordance with the present invention.
Figure 8:
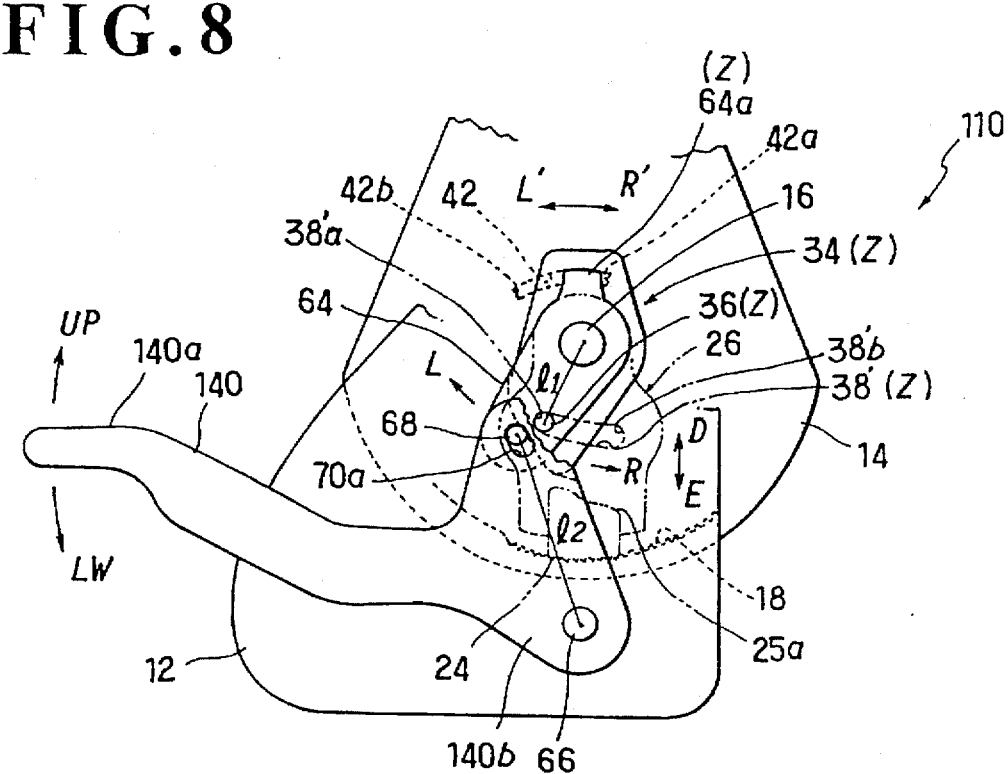
FIG. 8 is a diagram showing a principle of actions of the embodiment of FIG. 7.
Figure 9:
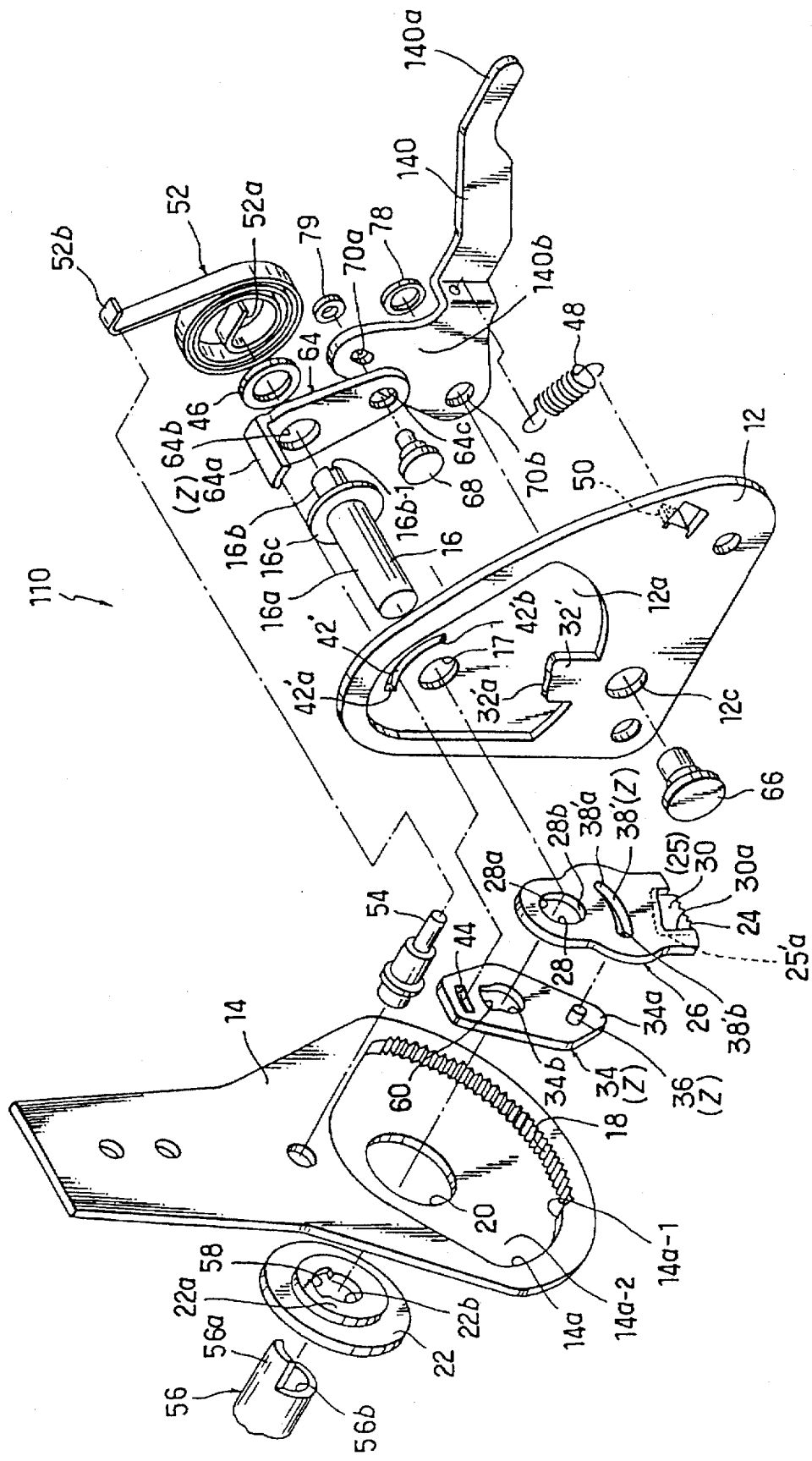
FIG. 9 is an exploded schematic perspective view of the embodiment of the reclining device of FIG. 7.

This basic structure in accordance with the present invention is embodied in a first embodiment shown in FIGS. 2 to 6 and in a second embodiment shown in FIGS. 7 to 9 with some modifications and additions permissible within the gist of the present invention. Of course, those modes are not limitative, and other further embodiment may be adopted in various ways within the gist of the present invention. It is noted that FIG. 6 shows, a minor additional alternative embodiment of association with the mode in FIGS. 2 to 5, by way of example.

Figure 10:
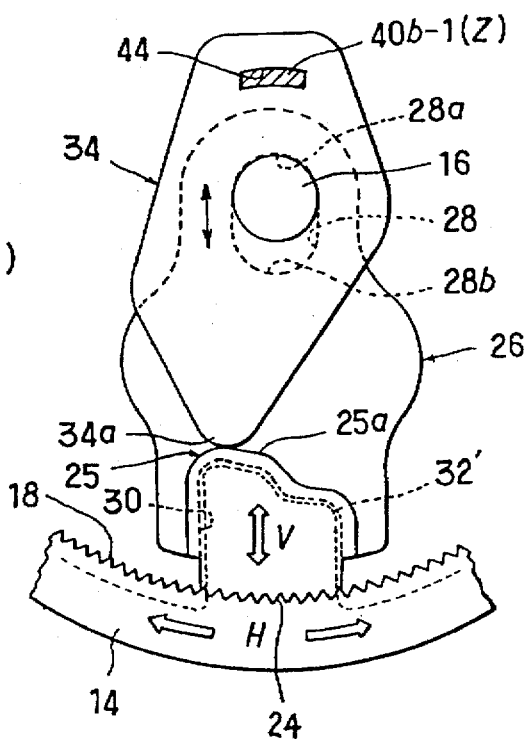
FIG. 10 is a schematic diagram showing a general principle of action in accordance with the present invention.

FIG. 10 schematically shows a principle for locking action which is common for both embodiment mentioned above in order to solve the unstable locking problems stated in the description of prior art above. The details thereof will become apparent later.

The upper and lower base arms (14)(12) are to be fixed to a seat back (SB) and a seat cushion (SC), respectively, as with ordinary reclining devices, which can be seen from the two-dot chain lines in FIG. 2.

Figure 4:
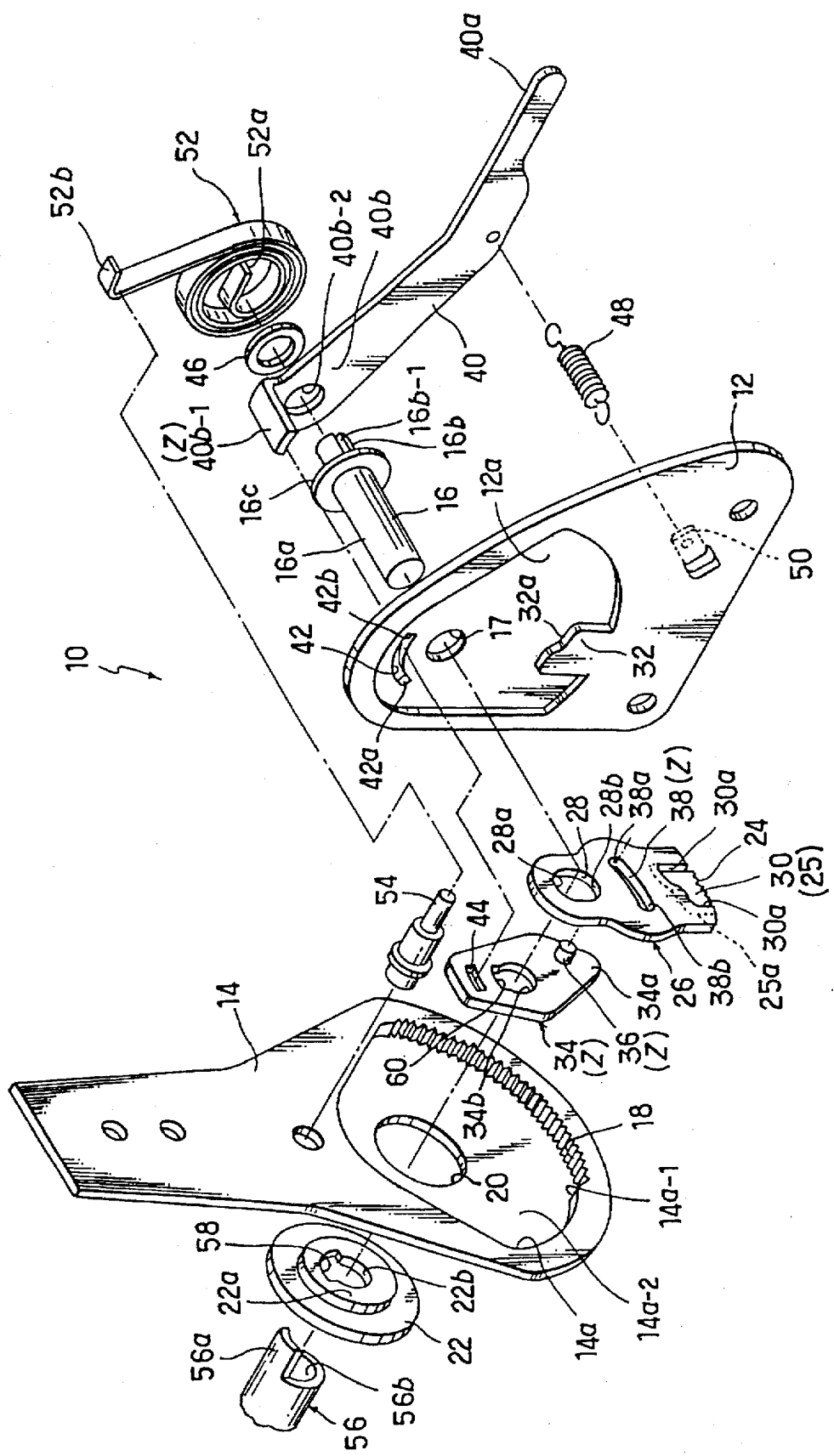
FIG. 4 is an exploded schematic perspective view of the reclining device of with FIG. 3.

Reference is now made to the first embodiment of the reclining device (10) shown in FIGS. 2 to 5. In this mode, the upper arm (14) is best shown in FIG. 4 as having a fan-shaped recessed area (14a) formed at the inward side of base end portion thereof. A connecting hole (20) is formed in the inner flat surface (14a-2) of such recessed area (14a) at a point corresponding to a center of rotation of the upper arm (14). The recessed area (14a) has an arcuate wall (14a-1) defined along a circle whose center is at that rotation center of upper arm (14). Further, an inwardly toothed portion (18) is formed in that arcuate wall (14a-1), as shown.

The lower base arm (12) is also depicted in FIG. 4, as having a generally fan-shaped recessed area (12a) formed in the inward surface thereof. Such recessed area (12a) is of a fan shape slightly greater than the foregoing fan-shaped recessed area (14a) of upper arm (14), and has, arranged therein, a bearing hole-(17) disposed at a point corresponding to the connecting hole (20) of the upper arm (14), an arcuate elongated hole (42) and a vertically extending guide portion (32). The bearing hole (17) is defined near to the upper side of recessed area (12a), through which bearing hole (17), the support shaft (16) is inserted supportively. The arcuate elongated hole (42) is defined immediate above the bearing hole (17) such as to extend therealong in a concentric relation with the bearing hole (17). The guide portion (32) is so formed at the lower curved side of recessed area (12a) as to protrude from the flat surface of the recessed area (12a), providing a raised coplanar surface continuous from the inward flat surface of base arm (12). This guide portion (32) further extends a predetermined distance from the curved side of recessed area (12a) towards the bearing hole (17) in a direction along a diameter of a circle having a center at the axis of bearing hole (17), and terminates in the shown upper end (32a).

As seen in FIGS. 4 and 5, the long shaft section (16a) of support shaft (16) passes through the bearing hole (17) of base arm (12), and the circular flange portion (16c) of same shaft (16) is abutted on the outward surface of base arm (12), to thereby mount the support shaft (16) in the base arm (12). Hence, a short split shaft section (16b) of support shaft (16) opposite to the long shaft section (16a) projects outwardly of the lower arm (12). An operation lever (40) is connected at the base end portion (40b) thereof to that short shaft section (16b) of support shaft (16), such that the base end part (40b) of lever (40) is rotatably supported, at its hole (40b-2), upon the short shaft section (16b), allowing an opposite free end part (40a) of same lever (40) to be rotated about the axis of support shaft (16). In this respect, the operation lever (40) is formed, at its base end portion (40b), integrally with an inwardly extending horizontal connecting lug (40b-1) which forms a part of the interlocking means (Z) to be explained later. The connecting lug (40b-1) passes through the arcuate elongated hole (42), projecting inwardly of the base arm (12). The operation lever (40) is prevented by a snap ring (46) against removal from the shaft (16), the snap ring (46) being firmly secured about the short split shaft section (16b) of shaft (16). It is noted that the arcuate elongated hole (42) has two extremities (42a) (42b) which define and limit the rotatable range of the operation lever (40).

As shown in FIG. 4, the operation lever (40) is provided with a spring (48) secured to a securing piece (50) formed on the outside of lower arm (12), and thus normally biased by the spring (48) downwardly towards a non-use position as indicated by the two-dot chain line in FIG. 3.

A spiral spring (52) is further mounted on the outward side of lower arm (12). As can be seen from FIGS. 4 and 5, the spiral spring (52) is secured, at the central end (52a) thereof, in the split (16b-1) of short shaft section (16b) associated with the shaft (16), via the foregoing snap ring (46). Another end (52b) of the spiral spring (52) is secured on a securing member (54) fixed to the upper arm (14).

The lock gear member (26) is formed in a vertically elongated configuration, having a half-blanked offset area (25) formed at the lower end thereof, an outwardly toothed portion (24) defined in the lower end of such offset area (25), a vertically elongated guide hole (28) perforated in the upper end part thereof, and an arcuate guide hole (38) perforated generally in the center of the lock gear member between the half-blanked offset area (25) and vertically elongated guide hole (28), the arcuate guide hole (38) forming one of the interlocking means (Z) as will become understood later, when as viewed from FIG. 3, the guide hole (38) is slanted downward so that its hole arches from the lower second extremity (38b) thereof upwardly to the upper first extremity (38a). This curvature serves to guide the lock gear member (26) in a vertical direction relative to both upper and lower base arms (14)(12) in cooperation with a guide pin (36) of cam plate (34), as will be described later. The offset area (25) is so formed by half blanking as to protrude from one side of the lock gear member (26), defining thereby a corresponding recessed guide area (30) on another side of the lock gear member (26). Such recessed guide area (30) of offset area (25) generally conforms in shape to the guide portion (32) of base arm (12), having a slightly greater dimensions relative thereto, and including a pair of vertically extending lateral walls (30a)(30a). As will become understood, the recessed guide area (30) and protruded guide portion (32) constitutes a female guide means and a male guide means, respectively, which are slidably fitted with each other to guide the lower end part of lock gear member (26). Thus, the lock gear member (26) is slidably supported by the shaft (16) at the upper end thereof, while being also slidably fitted on the protruded guide portion (32) at the lower end thereof, so that the lock gear member (26) is so slidably supported at the two points as to be movable vertically as understandable from FIG. 10.

Designation (34) represents a cam plate which also forms a part of the interlocking means (Z). As seen in FIGS. 4 and 5, the cam plate (34) is rotatably supported, at the circular hole (34b) thereof, upon the long shaft section (16a) of shaft (16). The cam plate (34) has an upper connecting hole (44) formed at the upper part thereof, an engagement pin (36) projected from one side thereof and a lower end (34a). The engagement pin (36) is slidably inserted in the guide hole (38) of lock gear member (26). The hole (34b) of cam plate (34) is formed with a cut-away region (60) into which a projected part (56a) of a connecting tubular member (56) is to be inserted. The connecting tubular member (56) is formed with an inner bore (56b) therein, into which the long shaft section (16a) of support shaft (16) is to be inserted so that the connecting tubular member (56) is supported rotatably on the shaft (16) in a coaxial manner.

The upper arm (14) is rotatably supported, at the connecting hole (20) thereof, upon the long shaft section (16a) of support shaft (16) by way of a collar member (22). In this respect, the circular collar member (22) has a circular projected portion (22a) slightly smaller in diameter than the connecting hole (20) of upper arm, and further a connecting hole (22b), having an arcuate cut-away region (58) defined partway circumferentially thereof, through which arcuate cut-away region (58), the projected part (56a) of connecting tubular member (56) passes. The arcuate cut-away region (58) provides an escapement for allowing the projected part (56a) of connecting tubular member (56) to be displaced freely with the rotation of operation lever (40). Accordingly, the collar member (22) is secured on the outward side of upper arm (14), with its circular projected portion (22a) fitted in the connecting hole (20) of upper arm (14), and the upper arm (14) is rotatably secured via the collar member (22) on the support shaft (16) to thereby be attached rotatably to the base arm (12), with both lock gear member (26) and cam plate (34) being interposed between the two mutually faced recessed areas (12a)(14a) respectively of lower base and upper arms (12)(14). Further, the projected part (56a) of connecting tubular member (56) is inserted through the arcuate cut-away region (58) of collar member (22) (i.e. through the hole (20)) of upper arm (14)) and fitted in the cut-away region (60) of cam plate (34).

Based on the above-described construction, referring to FIG. 3, in accordance with the mechanical arrangements of the present invention, when not in use, the operation lever (40) is biased by the spring (48) to a generally horizontal non-use position as indicated by the one-dot chain line in FIG. 3. In this case, the interlocking means (Z) is so retained under the biasing force of spring (48) as to keep the outwardly toothed portion (24) of lock gear member (26) in a meshed engagement with a predetermined part of the inwardly toothed portion (18). Namely, the connecting lug (40b-1) integral with the operation lever (40) is biased into contact with the left-side extremity (42b) of the arcuate elongated hole (42) of base arm (12), whereby the cam plate (34) connected with the connecting lug (40b-1) is biasingly retained in the illustrated upright posture, placing the lower end (34a) thereof in contact upon the upper side (25a) of offset area (25) of lock gear member (26). Thus, the lock gear member (26) is biased downwardly to force its outwardly toothed portion (24) down into a full mesh with a part of the inwardly toothed portion (18) of upper arm (14). In this non-use state, it is seen that the engagement pin (36) of cam plate (34) is contacted with the first extremity (38a) of guide hole (38).

Conversely, looking again at FIG. 3, when raising the operation lever (40) in the upward arrow direction (UP) against the biasing force of spring (48), the cam plate (34), i.e. one of the interlocking means (Z), is rotated about the shaft (16), in the clockwise direction (L), so that the lower end (34a) of cam plate (34) is brought out of contact with the protruded area (25, 25a) of lock gear member (26), and simultaneously, the engagement pin (36) of cam plate (34) is slidingly moved along the guide hole (38) towards the second extremity (38b) of same hole (38). With such clockwise rotation of cam plate (34), the lock gear member (26) is displaced upwardly, such that its vertically elongated guide hole (28) slides along both lateral surfaces of support shaft (16), while its recessed guide area (30) slides along the protruded guide portion (32) of base arm (12), both in the upward direction, thereby bringing its outwardly toothed portion (24) out of mesh with the inwardly toothed portion (18), as indicated by the arrow (D). At this point, the upper arm (14) is free to rotate about the shaft (16), allowing the seat back (SB) to be adjustably inclined forwardly and backwardly relative to the seat cushion (SC) by raising and lowering of the lever (40). Of course, to lower the lever (40) as indicated by the arrow (LW) will cause the cam plate (34) to rotate about the shaft (16) in the counter clockwise direction (R), so that the lower end (34a) of cam plate (34) is returned to the half-blanked offset area (25) of lock gear member (26), riding thereon and applying a downward pressure thereto, while simultaneously, the engagement pin (36) of cam plate (34) is slid upwards along the arcuate guide hole (38) in the direction from the second extremity (38b) to the first extremity (38a), of same hole (38), whereby the lock gear member (26) is lowered in a direction along the vertical line of both shaft (16) and projected guide portion (32), with the outwardly toothed portion (24) thereof being brought into mesh with the inwardly toothed portion (18) of upper arm (14). In this connection, it is preferable that the upper side (25a) of protruded area (25) of lock gear member (26) should be sloped to facilitate smooth riding thereon of the lock gear member lower end (34a), as illustrated.

Accordingly, referring to FIG. 10, it is appreciated that the lock gear member (26) is guided at the two points in the vertical line (V) thereof: Namely, the lock gear member (26) is guided by the support shaft (16) and the protruded guide portion (32) so as to be movable vertically along the diameter of a circle whose center is at the center of rotation of the upper arm (14), which means that there is no wobbling in the horizontal direction (H) with respect to the vertical movement (V) of the lock gear member (26), in contrast to the unstable vertical guiding of the prior-art gear block member mentioned above. In particular, the vertically elongated guide hole (28) of lock gear member (26) contacts two cambered opposite surfaces of shaft (16), which provides only two point contacts between the upper part of lock gear member (26) and the shaft (16), thereby minimizing a clearance therebetween, in contrast to the vertical full contact between two guide members (G) and both lateral sides of lock gear member (25') (see FIGS. 1 and 2) found in the prior art, which inevitably requires a certain clearance therebetween. This insures a stable full meshed engagement between the outwardly and inwardly toothed portions (24) (18) respectively of the lock gear member (26) and upper arm (14), and therefore there is no such fore-and-aft wobbling of the seat back (SB) as found in the prior art. Further, even if the clearances among the lock gear member (26), protruded guide portion (23) and shaft (16) are reduced too extremely to increase a friction among them, preventing smooth vertical sliding of block gear member (26), the interlocking means (Z), especially the interlocking actions between the cam plate (34) and lock gear member (26) as described above, insure application of enough downward and upward force to the lock gear member (26), enough to slide the same (26), overcoming such friction, for engagement with and disengagement from the inwardly toothed portion (18).

As suggested in FIG. 6, the support shaft (16) may be slightly altered to the one (16') formed with a non-circular long shaft section (16'a) having two arcuate lateral ends and two flat lateral sides, as shown. This alternative mode of shaft (16') is identical to the foregoing mode (16) in other portions: a short split shaft section (16'b) having a split (16'b-1) and a circular flange portion (16'c). Also, there is provided another mode of circular collar member (22') which is generally identical to that (22) of the first mode above, only excepting a non-circular connecting hole (23). This collar member (22') therefore has identical circular protruded portion (22'a) and arcuate cut-away region (58') to those (22a)(58) of collar member (22) of the first mode. The non-circular shaft section (16'a) of shaft (16') is inserted through the non-circular hole (23) of collar member (22'), as indicated in FIG. 6, whereby the collar member (22') is prevented against rotation about the shaft (16'), and further, after fitting the non-circular hole (23) of collar member (22') to the non-circular section (16'a) of shaft (16), the position of such cut-away region (58') may be fixed, allowing easy insertion of the projected part (56a) of connecting rod (56) thereinto.

Reference is made to FIGS. 7 to 9 which show the second embodiment of the reclining device (110). In this mode, all the constituent elements are identical to those of the foregoing first embodiment of the (10), except that a slight modification is made to the interlocking means (Z) and operation lever, including addition of a link member (64) therein. Hence, specific explanations are deleted with regard to the identical elements and parts to those of the first mode (10) for the sake of simplicity in description.

Namely, as understandable from FIG. 9, an interlocking means (Z) according to the present mode (110) differs from that of the first embodiment (10) only in that a horizontally extending connecting lug (64a) is provided in a link member (64), which is equivalent to and identical in dimensions to that (40b-1) of the first embodiment (10).

In the present mode (110), in addition to the foregoing interlocking means (Z), the base end (140b) of operation lever (140) is so formed to expand upwardly, and a link member (64) is arranged between that operation lever base end portion (140b) and the outward surface of base arm (12).

The above-noted interlocking means (Z) in this particular mode are therefore an alternative to the previously described interlocking means (Z) of the first mode (10) for the common purpose of causing vertical rotation of the lock gear member (26) for engagement with and disengagement from the inwardly toothed portion (18).

As likewise in the first mode (10), the cam plate (34') is rotatably supported, at the hole (34b) thereof, upon the long shaft section (16a) of support shaft (16), and has a connecting hole (44) formed at the upper end thereof and a lower end (34'a) to be in a pressing contact on the protruded area (25) of lock gear member (26).

The link member (64) is formed, at its upper end, with the horizontally extending connecting lug (64a) equivalent to that (40b-1) of the first mode (10). Also, the link member (64) has a first hole (64b) and a second hole (64c) formed therein. As shown, the connecting lug (64a) of link member (64) is inserted through the arcuate elongated hole (42') of base arm (12) and fitted in the connecting hole (44) of cam plate (34'), while the link member (64) per se is rotatably supported, at the first hole (64b) thereof, upon the short split shaft portion (16b) of support shaft (16).

The operation lever (140), is rotatably secured, at the hole (70b) thereof, on the pin (66), such as to be rotatable about the pin (66) in the vertical direction with respect to the base arm (12). The hole (70b) is disposed at the lower end of the upwardly expanding end portion (140b) of lever (140). A securing ring (78) is fixed to the pin (66) to avoid separation of the operation lever (140) from the base arm (12). In the upwardly expanding end portion (140b) of this lever (140), there is further formed a connecting hole (70a) in the upper end part thereof. The connecting hole (70a) is elongated an mount required to give an escapement to a connecting pin (68) to be mentioned below.

The link member (64) is interlocked to the upwardly expanding end portion (140b) of operation lever (140), such that the connecting pin (68) is inserted through the second hole (64c) and connecting hole (70a) respectively of the link member (64) and operation lever (140). A securing ring (79) is fixed to that pin (68) to avoid separation of the link member (64) and operation lever (140) from each other.

Based on the above-described construction, referring to FIGS. 7 and 8, in accordance with the mechanical arrangements of this second mode (110), when not in use, the operation lever (140) is biased by the spring (48) to a generally horizontal non-use position as shown in both FIGS. 7 and 8. In this condition, the interlocking means (Z) is so retained under the biasing force of spring (48) as to keep the outwardly toothed portion (24) of lock gear member (26) in a meshed engagement with a predetermined part of the inwardly toothed portion (18). Namely, the connecting lug (64a) connected via the link member (64) to the operation lever (140) is biased into contact with one extremity (42'a) of the arcuate elongated hole (42') of base arm (12), whereby the cam plate (34) connected with the connecting lug (40b-1) is biasingly retained in the illustrated upright posture, placing the lower end (34a) thereof in contact-upon the upper side (25a) of offset area (25) of lock gear member (26). Thus, the lock gear member (26) is biased downwardly to force its outwardly toothed portion (24) down into a full mesh with a part of the inwardly toothed portion (18) of upper arm (14). In this non-use state, it is seen that the engagement pin (36) of cam plate (34) is contacted with the left-side extremity (38'a) of guide hole (38').

Conversely, looking again at FIG. 8, when raising the operation lever (140) in the upward arrow direction (UP) against the biasing force of spring (48), the cam plate (34), i.e. one of the interlocking means (Z), is rotated about the shaft (16) in the clockwise direction (L), so that the lower-end (34a) of cam plate (34) is brought out of contact with the offset area (25, 25a) of lock gear member (26), and simultaneously, the engagement pin (36) of cam plate (34) is slidingly moved along the guide hole (38') towards the right-side extremity (38'b) of same hole (38'). With such clockwise rotation of cam plate (34), the lock gear member (26) is displaced upwardly, such that its vertically elongated guide hole (28) slides along both lateral surfaces of support rod (16), while its recessed guide area (30) slides along the protruded guide portion (32') of base arm (12), both in the upward direction, thereby bringing its outwardly toothed portion (24) out of mesh with the inwardly toothed portion (18), as indicated by the arrow (D). At this point, the upper arm (14) is free to rotate about the shaft (16), allowing the seat back (SB) to be adjustably inclined forwardly and backwardly relative to the seat cushion (SC) by raising and lowering of the lever (140). Of course, to lower the lever (140) as indicated by the arrow (LW) will cause the cam plate (34) to rotate about the shaft (16) in the a counter-clockwise direction (R), so that the lower end (34a) of cam plate (34) is returned to the half-blanked offset area (25) of lock gear member (26), riding thereon and applying a downward pressure thereto, while simultaneously, the engagement pin (36) of cam plate (34) is slid upwards along the arcuate guide hole (38') in the direction from the right-side extremity (38'b) to the left-side extremity (38'a), of same hole (38'), whereby the lock gear member (26) is lowered in a direction along the vertical line of both shaft (16) and projected guide portion (32'), with the outwardly toothed portion (24) thereof being brought in a full mesh with a selected part of the inwardly toothed portion (18) of upper arm (14). Thus, the seat back (SB) can be locked at a selected angle relative to the seat cushion (SC).

Accordingly, the same advantageous effects as described in the first embodiment (10) can be attained in this second embodiment (110) to avoid the unstable, wobbling engagement between the lock gear and inwardly toothed portion found in the prior art. In addition, according to the second mode (110), the formation of upwardly expanding base portion (140b) in the lever (140) and provision of the link member (64) may be effective in amplifying the amount of displacement for both cam plate (34) and lock gear member (26) by a small amount of vertical rotation of the free end portion (140a) of operation lever (140). This is because, as understandable from FIGS. 7 and 8, the distance ($l_2$) defined between the hole (70a) and the rotation center (at 66) of lever (140) may be adjustably longer to increase the diameter of a circle along which the upper end of upwardly expanding base portion (140b) of lever (140) is rotated relative to the pin (66), thereby permitting the amount of displacement for the lock gear member (26) to be amplified more by a smallest possible amount of vertical rotation of the lever (140). Further, such distance ($l_2$) may also be adjustably greater than another distance ($l_1$) between the engagement pin (36) and shaft (16) in order to amplify the amount of displacement for the pin (68) relative to the shaft (16). In other words, as shown in FIG. 7, the first distance ($l_2$) corresponds to a first diameter of circle along which the upper end of operation lever base portion (140b) is rotated relative to the pin (66), and the second distance ($l_1$) corresponds to a second diameter of circle along which the engagement pin (36) is rotated relative to the shaft (16). Hence, by making the first diameter (at $l_2$) longer than the second diameter (at $l_1$), the rotation amount ($\theta_2$) of link member (64) may be amplified by a small amount of rotation ($\theta_1$) of the lever (140), whereby the cam plate (34') connected to the pin (68) as well as the guide pin (36) may also be increased in amount of rotation accordingly by rotating the lever (140) a small amount. Consequently, the lock gear member (26) can be quickly brought out of engagement with the outwardly toothed portion (18), while being quickly released from the downward pressure of lower end (34a) of cam plate (34), through a very small amount of upward rotation of the lever (140).

In both of the first and second modes (10)(110), it is further appreciated that their respective interlocking means (Z) are provided coaxially on the shaft (16) and require small number of constituent elements, so as to simplify the structure of reclining device, and that the connecting tubular member (46) may be rotated via their respective interlocking means (Z) by the vertical rotation of operation lever (40 or 140).

In this context, when the above-described reclining mechanisms are applied to a dual-type reclining device as shown in FIG. 2, it has been an ordinary way to locate a connecting rod (56') below the center of rotation between upper and base arms (14')(12') in order to avoid interference between the connecting rod (56') and vertically disposed elements (26, 34, 32 . . . ) in the reclining device.

Conventionally, as in FIG. 2, a pair of arcuate through-holes (12'a) has been formed in the two base arms (12')(12') fixed on the seat frame (F), respectively, as an escapement means for allowing both ends of the connecting rod (56') to be moved freely therealong with fore-and-aft rotation of the upper arms (14') relative to the base arms (12'). However, such formation of escapement holes (12'a) in the base arm (12) has been found to result in reducing the strength and rigidity of the base arm (12) itself and thus requiring reinforcements, as by increasing its thickness and size of the same, which is undesirable in costs involved. For that reason, as can be seen from all the descriptions and illustrations, there is provided the connecting tubular member (56) having an inner bore (56b) and projected part (56a). The projected part (56a) of this member (56) is fitted in the cut-away region (60) of cam plate (34), while the long section (16a or 16') of support shaft (16 or 16') is inserted in the inner bore (56b). Thus, the connecting member tubular member (56) is connected to the shaft coaxially, and further operatively connected via the interlocking means (Z) to the operation lever (40 or 140), which therefore does not need to form such escapement hole (12'a) in the base arm (12). Although not shown, the connecting tubular member (56) is formed with the same projected part (56a) on other end thereof for connection with another same reclining device, as the present invention is applied to a dual-type reclining device construction shown in FIG. 2.

It is noted-that the vertically extending elongated hole (28) of lock gear member (26) has upper and lower extremities (28a)(28b) which serve to limit the vertical movable range of the lock gear member (26). Those two extremities (28a)(28b) of hole (28) should desirably be defined in relation to the the arcuate hole (42 or 42') and guide hole (38 or 38') in order to determine a proper limit of coactive range among them to limit the rotation range of the operation lever (40 or 140).

While having described the present invention thus far, it should be understood again that the invention is not limited to the illustrated embodiments, but other modifications, replacements and additions may be structurally and mechanically applied thereto without departing from the scopes of the appended claims. Naturally, it is free to adopt one of the first and second modes (10)(110) or to only choose one of the two interlocking means (Z). Also, it is not limitative whether the action amplifying means (64)(140b) may be added or not, or whether another shapes of shaft (16') and collar member (22') may be used or not, and it is indeed possible to combine those modes together appropriately, depending on design requirements, within the gist of the present invention.

What is claimed is:

1. A reclining device for a vehicle seat, which includes an upper arm to be fixed to a seat back of the seat and a lower base arm to be fixed to a seat cushion of the seat, said upper arm being rotatable via a shaft with respect to said lower base arm, said reclining device comprising:

an arcuate inwardly toothed portion which is formed in said upper arm, generally along a circle having a center at an axis of said shaft;

a projected guide portion formed in said lower base arm, said projected guide portion extending in a diametrical direction along a diameter of said circle along which said arcuate inwardly toothed portion is formed in the lower base arm;

a lock gear means which includes:
an outwardly toothed portion for meshed engagement with said arcuate inwardly toothed portion of said lower base arm;

a contact area projecting from a first side of said lock gear means;

a first slide means disposed in said diametrical direction, said first slide means comprising an elongated hole through which said shaft is slidably inserted; and a second slide means disposed in said diametrical direction, said second slide means comprising a slide recession formed at a second side of said lock gear means opposite to said first side of the lock gear means where said contact area is formed;

said projected guide portion of said lower arm being slidably fitted in said slide recession of said second slide means;

wherein said lock gear means is movable via said first and second slide means in said diametrical direction, bringing said outwardly toothed portion to and out of a meshed engagement with a part of said arcuate inwardly toothed portion, to thereby lock and unlock said upper arm with respect to said lower base arm;

an operation lever having a base end portion rotatably connected to said shaft;

a biasing means for normally biasing said operation lever to a non-use position; and an interlocking means arranged between said lock gear means and said operation lever, said interlocking means including:
a cam means rotatably provided on said shaft, said cam means having a cam end for contact with said contact area of said lock gear means;
an engagement guide means for engaging said cam means with said lock gear means and guiding said lock gear means in said diametrical direction; and
a connecting means for connecting said cam means to said operation lever, wherein when not in use, said operation lever is retained at said non-use position under a biasing force of said biasing means, which in turn biasingly causes said outwardly toothed portion of said lock gear means to be in a meshed engagement with a part of said arcuate inwardly toothed portion, via said-first and second slide mean, while also biasingly causing said cam end of said-cam means to pressingly contact said contact area of said lock gear means to thereby assist in retaining said outwardly toothed portion in the meshed engagement with said part of said arcuate inwardly toothed portion, and wherein rotation of said operation lever about said shaft from said non-use position causes said lock gear means to be displaced in said diametrical direction via said first and second slide means as well as via said engagement guide means, thereby bringing said outwardly toothed portion out of the meshed engagement with said inwardly toothed portion, while simultaneously causing said cam means to rotate about said shaft in a direction to bring said cam end thereof out of contact with said contact area of said lock gear means.

2. The reclining device as defined in claim 1, wherein said engagement guide means comprises an elongated guide hole formed in said lock gear means and an engagement pin formed on said cam means, said engagement pin being slidably engaged in said elongated guide hole, and wherein said elongated guide hole is slanted relative to said shaft so as to cause said engagement pin to slide therealong in a direction to transform rotation of said cam means about said shaft into movement of said lock gear means in said diametrical direction.

3. The reclining device as defined in claim 1, wherein said contact area is formed by half blanking said first side of said lock gear means thereby defining said recessed guide area at said second side of said lock gear means, said recessed guide area serving as said second guiding means.

4. The reclining device as defined in claim 1, wherein said lock gear means comprises a vertically elongated lock gear member in which said first and second slide means are defined along a vertical line thereof, and wherein said engagement guide means is provided in such a manner as to cause said vertically elongated lock gear member to be moved along said diametrical direction via said first and second slide means so as to bring said outwardly toothed portion to and out of meshed engagement with said arcuate inwardly toothed portion.

5. The reclining device as defined in claim 4, wherein said lock gear means comprises a vertically elongated lock gear member in which said first and second slide means are defined along a vertical line thereof, wherein said elongated hole and said slide recession are respectively formed in upper and lower parts of said vertically elongated lock gear member in such a manner to extend along said vertical line, and wherein said engagement guide means comprises a slanted elongated hole which is formed in said vertically elongated lock gear member in a direction intersecting said vertical line.

6. The reclining device as defined in claim 1, wherein said base end portion of said operation lever is so formed as to extend upwardly, wherein said operation lever is rotatably supported, at a lower end part of such base end portion thereof, upon a pin which is fixed to said lower base arm at a point apart from said shaft, and wherein there is provided a link means for linking said base end portion of said operation lever to said cam means via said connecting means, said linking means being rotatably supported on said shaft.

7. The reclining device as defined in claim 6, wherein said link means comprises a link member having an upper portion rotatably supported on said shaft and a lower portion connected to an upper end part of said base end portion of said operation lever, wherein said connecting means comprises a connecting lug projected from the upper portion of said link member, said connecting lug being connected to said cam means, and wherein said base end portion of said operation lever is so arranged that said upper end part thereof is disposed from said pin at a distance greater than a distance between said upper and lower portions of said link member.

8. The reclining device as defined in claim 7, wherein said lower portion of said link member is connected via a pin to a connecting hole formed in the upper part of said base end portion of said operation lever.

9. The reclining device as defined in claim 1, wherein said upper arm is formed with a hole through which said shaft is inserted, wherein said shaft has a non-circular section formed therein, wherein a collar member is fitted in said hole of said upper arm, said collar member having a non-circular hole formed therein, and wherein said non-circular section of said shaft is fitted in said non-circular hole of said collar member.

10. The reclining device as defined in claim 1, wherein said upper arm is formed with a hole through which said shaft is inserted, wherein one end of a connecting tubular member is rotatably inserted via a collar member through said hole of said upper arm and further connected to said cam means.

11. The reclining device as defined in claim 10, wherein another end of said connecting tubular member is also rotatably inserted via a collar member through a hole of an upper arm of another reclining device identical to said reclining device and further connected to a cam means of said another reclining device, thereby establishing a dual-type reclining device.

12. The reclining device as defined in claim 10, wherein said one end of said connecting tubular member is formed with a connecting lug, wherein said collar member has a circular hole formed therein, through which circular hole, one end portion of said shaft is inserted, wherein a cut-away region is formed in said circular hole to serve as an escapement hole for allowing said connecting lug of said connecting tubular member to be moved freely, wherein said connecting lug of said connecting tubular member is inserted through said cut-away region and connected to said cam means, and wherein said one end portion of said shaft is inserted through said circular hole of said collar member and further inserted in an inner bore of said connecting tubular member.

13. The reclining device as defined in claim 1, wherein said connecting means comprises a connecting lug projected integrally from said base end portion of said operation lever, and wherein said connecting lug is connected to an upper end portion of said cam means.

14. The reclining device according to claim 1, wherein said contact area is so sloped as to facilitate smooth riding of said cam end thereon.

15. The reclining device as defined in claim 1, wherein said biasing means comprises a spring extended between one free end portion of said operation lever and said lower base arm.

* * * * *